S. C. HARTSOCK.
BOLSTER FOR VEHICLES.
APPLICATION FILED AUG. 30, 1920.
1,383,203.
Patented June 28, 1921.
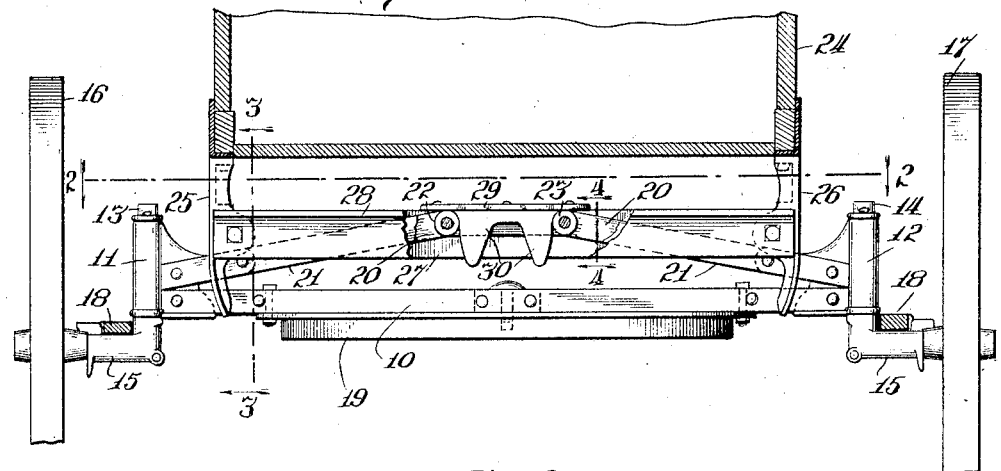
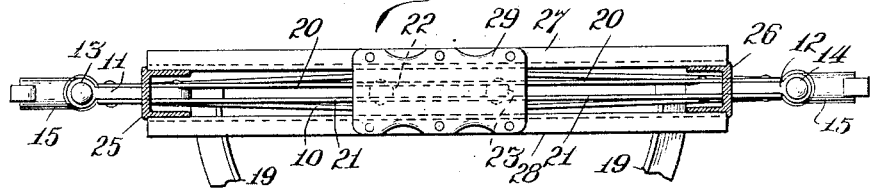
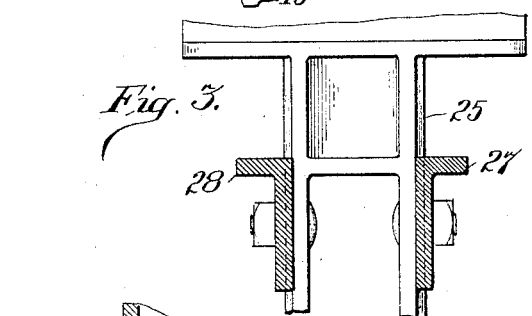
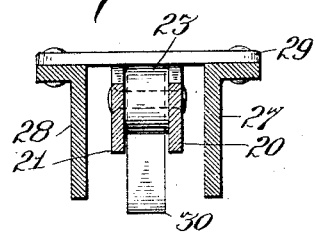
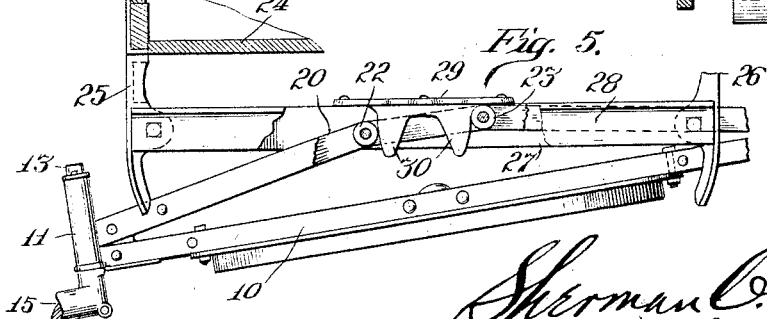

UNITED STATES PATENT OFFICE.

SHERMAN C. HARTSOCK, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

BOLSTER FOR VEHICLES.

1,383,203.   Specification of Letters Patent.   Patented June 28, 1921.

Application filed August 30, 1920. Serial No. 406,878.

*To all whom it may concern:*

Be it known that I, SHERMAN C. HARTSOCK, a citizen of the United States, and a resident of Moline, in the county of Rock Island and State of Illinois, have invented certain new and useful Improvements in Bolsters for Vehicles, of which the following is a specification, reference being had to the accompanying drawings.

This invention relates to bolsters for vehicles and is particularly designed for use upon a fertilizer distributer. It is the object of my invention to provide a construction and arrangement by reason of which the body of the vehicle is not compelled to follow the vertical movements of the carrying wheels, but is adapted to yield with respect thereto, whereby the body is protected from a great many jars and twisting stresses which otherwise would have a tendency to weaken the structure. A further object attained by my construction is the provision of a shifting fulcrum or support for the body upon the axle whereby that one of the wheels which is in a lowered position with respect to the other wheel by reason of the unevenness of the ground over which the vehicle is traveling is given a greater leverage with respect to the body than that of the other wheel, whereby such lowered wheel is enabled the more easily to rise to normal position. The preferred means by which I have accomplished my objects are illustrated in the drawings and are hereinafter specifically described. That which I believe to be new and desire to secure by Letters Patent is set forth in the claims.

In the drawings,—

Figure 1 is a transverse section through a vehicle embodying my invention, being partly broken away for clearness of illustration;

Fig. 2 is a horizontal section taken on line 2—2 of Fig. 1;

Fig. 3 is an enlarged detail, being a vertical section taken on line 3—3 of Fig. 1;

Fig. 4 is an enlarged detail, being a vertical section taken on line 4—4 of Fig. 1; and Fig. 5 is a fragmentary view similar to Fig. 1, but showing a changed position of certain of the parts.

Referring to the several figures of the drawings in which corresponding parts are indicated by the same reference characters,—

10 indicates two transversely-extending bars of an axle having brackets 11 and 12 fixedly mounted at their ends. Axle members 13 and 14 are journaled in suitable sleeves formed integrally with the brackets 11 and 12, the axle members having elbow clips 15 fixed thereon adjacent to the hubs of carrying wheels 16 and 17 journaled on horizontal portions of said axle members. Arms 18 are carried by the clips 15 for turning the axle members and the wheels laterally with respect to the vehicle. An arc-shaped bar 19 is fixedly mounted on the transversely extending bars 10 to serve as the fifth wheel of the vehicle, as will be readily understood.

20 and 21 indicate two upwardly bowed cross-bars each connected at its ends with the brackets 11 and 12 and forming part of the axle upon which the carrying wheels 16 and 17 are mounted. As is shown in Figs. 2 and 4, these axle cross-bars are spaced a short distance apart and are provided at their uppermost portions with rollers 22 and 23 revolubly mounted therebetween. 24 indicates the body of the vehicle having forked brackets 25 and 26 fixedly mounted thereon at opposite sides. Two cross-bars 27 and 28 are fixedly mounted upon the brackets 25 and 26 in spaced relation, as is best shown in Figs. 2 and 4. Midway between their ends the bars 27 and 28 have fixedly mounted thereon a bearing plate 29, which thus constitutes a part of the bolster and against which plate the upper edges of the upwardly-bowed cross-bars 20 and 21 bear, as is shown in Figs. 1 and 4. The bearing plate 29 is provided with a depending lug 30 which extends downwardly between the bars 20 and 21 and is so shaped as to have a snug fit between the rollers 22 and 23, as is best shown in Fig. 1. The edges of the lug are curved or inclined, as shown, so as not to offer any obstruction to the free rocking of the axle as one or the other of the vehicle wheels is lowered by passing into a depression in the roadway, and so as to also maintain at such times the desired contact of the lug with both of the rollers 22 and 23. As will be readily understood from an inspection of the drawings, the lug 30 of the bearing plate 29 thus serves, in connection with the two rollers, to movably interlock the bolster and axle in such manner as to hold the axle structure from moving either laterally or longitudinally of the vehicle with respect to the bolster structure. Inasmuch as the forked brackets 25 and 26 straddle the axle structure, the intermediate portion of the axle structure is held against swinging laterally with respect to the body of the vehicle. However, by the provision of the construction as above described, the axle structure is free to swing vertically with respect to the bolster and with respect to the body so as to permit of a free movement of the axle structure to meet the inequalities of the ground without any tendency to twist the vehicle body 24 out of normal shape. As will be appreciated, particularly by an inspection of Fig. 5, when one end of the axle structure is lowered with respect to the opposite end, the bearing of the axle upon the plate 29 is caused to shift to the roller 23 as distinguished from the normal bearing, as shown in Fig. 1. If the end of the axle construction at the left in Fig. 5 were caused to rise beyond normal position, in that case the bearing of the axle member upon the vehicle body would be caused to shift from the roller 23 to the roller 22.

What I claim as my invention and desire to secure by Letters Patent, is—

1. In combination, a vehicle body, a bolster carried thereby, an axle comprising two members one over the other rigidly connected together at their ends, the upper member being upwardly bowed and unconnected at its central portion with the lower member, said bolster having a laterally-shiftable bearing upon said upper axle member, and rigid means depending from the vehicle body near each side thereof and straddling said axle.

2. A vehicle comprising a body, a bolster fixedly mounted thereon, a rigid bowed axle member adapted to support said bolster and also adapted to swing freely up and down with respect thereto, and carrying wheels revolubly connected with said axle member, the bearing between said axle member and said bolster being adapted to shift laterally toward the higher wheel as one of said wheels is lowered with respect to the other.

3. A vehicle comprising a body, a bolster formed of two transversely disposed bars spaced part and rigidly secured to said body, an axle bowed upwardly and having its middle portion positioned between the bars of said bolster and movably connected therewith, and a bearing member carried by said bolster against which said axle member is adapted to bear at either of two points on opposite sides of the middle of the body when said axle is rocked vertically.

4. A vehicle comprising a body, a bolster fixedly mounted thereon, a rigid bowed axle member adapted to support said bolster and also adapted to swing freely up and down with respect thereto, means for holding said axle member against lateral movement with respect to said bolster, and carrying wheels revolubly connected with said member, the bearing between said member and said bolster being adapted to shift laterally toward the higher wheel as one of said wheels is lowered with respect to the other.

5. A vehicle comprising a body, a transversely extending bar fixedly mounted on said body, a rigid axle member bowed upwardly at its middle portion, means for holding said axle member against either longitudinal or lateral movement with respect to said transversely extending bar while at the same time permitting the axle to swing freely up and down, and forked brackets connected to said transversely extending bar and straddling said axle member, the bearing between said axle member and said transversely extending bar being adapted to shift laterally as the axle swings vertically with respect to said bar.

6. A vehicle comprising a body, an axle comprising two upwardly bowed transversely extending bars arranged side by side, carrying wheels journaled on said axle, a bearing plate carried by said body having a lug extending downward between said axle bars, and means for preventing lateral movement of said lug with respect to said bars, said bearing plate being adapted to have a laterally shifting bearing on said axle bars as the axle swings up and down with respect thereto.

7. A vehicle comprising a body, an axle comprising two upwardly bowed transversely extending bars, carrying wheels journaled on said axle, a bearing plate carried by body having a lug extending downward between said axle bars, and rollers mounted between said bars on opposite sides of said lug, the bearing between said bearing plate and said bars being adapted to shift from one to the other of said rollers as said axle swings vertically with respect to the body.

8. A vehicle comprising a body, an axle comprising two upwardly bowed transversely extending bars, carrying wheels journaled on said axle, a bearing plate carried by said body having a lug extending downward between said axle bars, rollers mounted between said bars on opposite sides of said lug, and forked brackets carried by said body and straddling said axle at the sides of the vehicle, the bearing between said bearing plate and said bars being adapted to shift from one to the other of said rollers as said axle swings up and down with respect to the body.

9. A vehicle comprising a body, a forked bracket depending from said body at each side thereof, two cross-bars connected to said brackets in spaced relation to each other, a bearing plate secured to said cross-bars, a lug depending from said bearing plate between said cross-bars, an axle provided with a suitable opening to receive said lug and positioned between the bearings of said forked brackets at the sides of the vehicle, and carrying wheels journaled on said axle, the bearing between said axle and said bearing plate being adapted to shift laterally toward the higher wheel as one of said wheels is lowered with respect to the other.

10. A vehicle comprising a body, a forked bracket depending from said body at each side thereof, two cross-bars connected to said brackets in spaced relation to each other, a bearing plate secured to said cross-bars, a lug depending from said bearing plate between said cross-bars, an axle comprising two upwardly-bowed cross-bars spaced apart and adapted to work freely between the cross-bars carried by said brackets, rollers mounted between said second-named cross-bars on opposite sides of said lug, and carrying wheels journaled on said axle, said axle being adapted to swing up and down freely between the prongs of said forked brackets, the bearing between said axle cross-bars and said bearing plate being adapted to shift from one roller to the other as one wheel is raised with respect to the other wheel.

11. The combination with a vehicle body and a bolster therefor, of an upwardly-bowed rigid axle member upon the central portion of which said bolster bears, and means carried by the bolster and said bowed axle member, respectively, for movably interlocking with each other to restrain the axle from endwise shifting but permitting it to rock vertically.

12. The combination with a vehicle body and a bolster therefor, of an upwardly-bowed rigid axle member upon the central portion of which said bolster bears, and means carried by the bolster and said bowed axle member, respectively, for movably interlocking with each other to restrain the axle from endwise shifting but permitting it to rock vertically, said interlocking means comprising a downwardly-depending lug carried by the bolster and two devices projecting from the face of the bowed axle member and in contact with opposite edges of said lug.

13. The combination with a vehicle body and a bolster therefor, of an upwardly-bowed rigid axle member upon the central portion of which said bolster bears, and means carried by the bolster and said bowed axle member, respectively, for movably interlocking with each other to restrain the axle from endwise shifting but permitting it to rock vertically, said interlocking means comprising a downwardly-depending lug carried by the bolster and two rollers projecting from the face of the bowed axle member and in contact with opposite edges of said lug.

14. The combination with a vehicle body and a bolster therefor, of an upwardly-bowed rigid axle member upon the central portion of which said bolster bears, and means carried by the bolster and said bowed axle member, respectively, for movably interlocking with each other to restrain the axle from endwise shifting but permitting it to rock vertically, said interlocking means comprising a downwardly-depending lug carried by said bolster and having curved or inclined edges and two devices projecting from the face of the bowed axle member and in contact with said edges of the lug.

15. The combination with a vehicle body and a bolster therefor, of an axle comprising a straight member and an upwardly-bowed member fixedly secured at its ends to end portions of the said straight member, said bolster resting upon the central portion of said upwardly-bowed axle member, and means carried by the bolster and said bowed member, respectively, for interlocking with each other to restrain the axle from endwise shifting but permitting it to rock vertically.

16. The combination with a vehicle body and a bolster therefor, of an axle comprising a straight member and an upwardly-bowed member fixedly secured at its ends to end portions of the said straight member, said bolster resting upon the central portion of said upwardly-bowed axle member, forked members depending from opposite ends, respectively, of the bolster adapted to straddle both the straight and bowed members of the axle, and means carried by the bolster and the said bowed axle member, respectively, for interlocking with each other to restrain the axle from endwise shifting but permitting it to rock vertically.

SHERMAN C. HARTSOCK.